Figure 1:
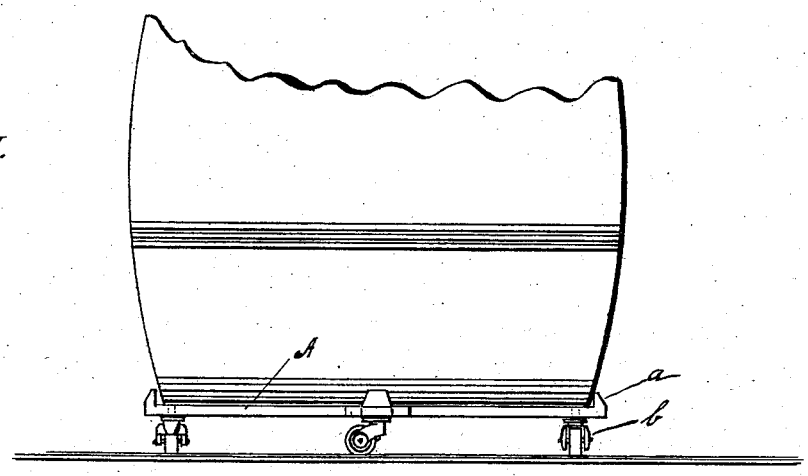

(No Model.)

J. H. QUACKENBUSH.
BARREL MOVER.

No. 260,049. Patented June 27, 1882.

WITNESSES
Jas. W. Sears.
K. S. Irving

INVENTOR
James H. Quackenbush
By Charles E. Foster
ATTORNEY.

UNITED STATES PATENT OFFICE.

JAMES H. QUACKENBUSH, OF KALKASKA, MICHIGAN.

BARREL-MOVER.

SPECIFICATION forming part of Letters Patent No. 260,049, dated June 27, 1882.

Application filed September 8, 1881. (No model.)

*To all whom it may concern:*

Be it known that I, JAMES H. QUACKENBUSH, of Kalkaska, in the county of Kalkaska and State of Michigan, have invented certain new and useful Improvements in Barrel-Movers; and I do hereby declare that the following is a full, clear, and exact description of the invention, which will enable others skilled in the art to which it appertains to make and use the same, reference being had to the accompanying drawings, which form a part of this specification.

My invention relates to improvments in devices for facilitating the moving of barrels or boxes in and about stores, &c.; and it consists in an arrangement of bars having stationary and adjustable shoulders, for the purpose hereinafter stated, combined with revolving casters attached thereto, thus forming a movable platform whereon a box or barrel may be placed for the purpose of transferring from one point to another; and it also consists, in combination therewith, of certain means employed by which the said platform may be secured at one place in a pivotal manner, all constructed and operated as more fully hereinafter stated.

The object of my invention is to furnish storekeepers and others with such a device as will combine within itself all the advantages derived from the use of a barrel-swing, by which they are enabled to keep their goods beneath the counter and out of the way, and also enable them, when desired, to move said barrels about the store in any direction as freely and quickly as though placed on a common truck, but avoiding the labor incident to its use.

In order to enable others skilled in the art to which my invention appertains to make and use the same, I will now proceed to describe its construction and operation, reference being had to the annexed drawings, in which—

Figure 2:
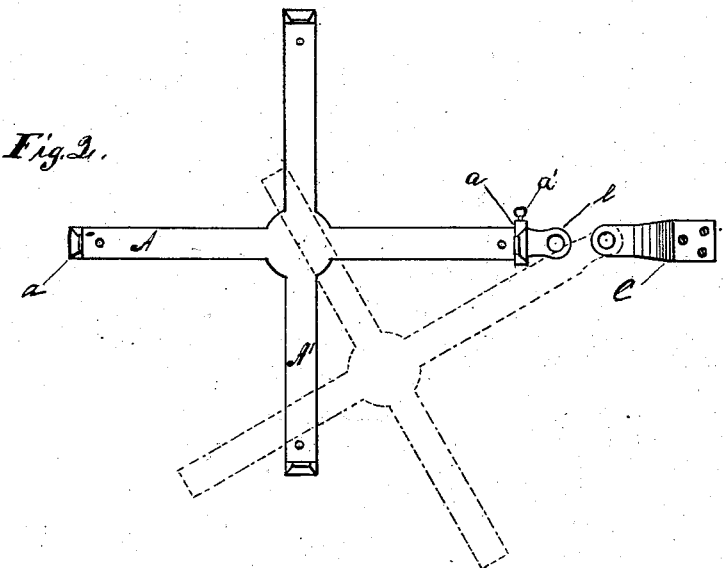
Figure 3:
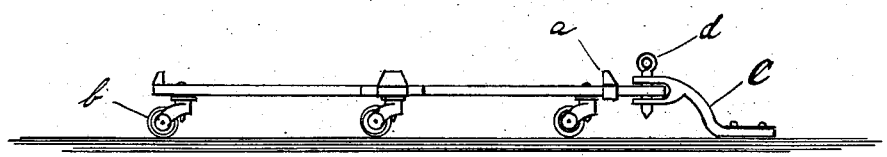

Figure 1 is a side elevation of a barrel with my device beneath, whereon it rests, and is in condition to be moved in any direction about a store-room. Fig. 2 is a top view of my invention, represented in the broken lines as being pivotally attached at one end. Fig. 3 is a side elevation of the same.

Similar letters of reference indicate like parts.

A A' represent crossed bars secured together at about their middle, and forming the frame of my platform.

At or near the ends of the upper side of the bars A A' are constructed the shoulders $a$, which serve to prevent the barrel placed on the platform from slipping off when moved about the store-room floor. These shoulders $a$ may, if found desirable, be so constructed as to be adjustable, so as to clamp the edge of the barrel closely, as indicated in Fig. 2 of the drawings, where one is represented as being composed of a band around the bar, having a projection or shoulder on top, and being susceptible of adjustment thereon at will, and of being fixed in any desired position by means of a set-screw, $a'$, or other means.

The casters $b$, which are attached in a suitable manner to the under side of the bars A A', are constructed in the ordinary manner, and therefore permit the platform to be rolled in any desired direction.

When it is required to so pivot the platform that it may only be moved beneath or from under a counter or other stationary covering for the opened top of the barrel resting thereon, it is attached to the bracket $c$, secured to the floor or otherwise, having the bifurcated ends, through which a shouldered pin, $d$, passes by the openings formed therein, and also enters the circular opening $e$ at the end of the bar A, which has been placed between the forked ends of the bracket $c$, as shown in Figs. 2 and 3.

Other devices have been invented for moving barrels, and also for pivoting them; but when intended for moving the barrel about the store they only permit of a forward and retracting movement, unless manual labor be employed to lift the platform bodily when it becomes necessary to move it in other directions; but by the use of my invention, as will be easily understood, the platform, with its weight or burden, can be moved either in a circle, when pivoted as described, or in any direction, when freed from the bracket, without the expenditure of more labor than is needed to move an ordinary cask or barrel when on its side. My invention therefore embodies within itself all the advantages gained from the use of the ordinary barrel-swing, and is superior to the common platform for the reasons stated.

I do not confine myself to the use of the crossed bars A A', as it will be readily conceived that I may substitute therefor any form of frame whereon the barrel, &c., may rest without departing from the spirit of my invention.

Having thus described my invention, what I claim as new, and desire to secure by Letters Patent, is—

1. The combination of a platform having revolving casters with a stationary bracket, to which the platform is pivotally attached, as and for the purpose set forth.

2. In a barrel-mover consisting of a platform composed of crossed bars which are supported on revolving casters, the combination therewith of an attachment consisting of a band fitted loosely on one of said bars and having an upwardly-projecting shoulder, and provided with a set-screw, as shown and described, and for the purpose set forth.

In testimony that I claim the foregoing as my own I have hereto affixed my signature in presence of two witnesses.

JAMES H. QUACKENBUSH.

Witnesses:
WM. D. TOTTEN,
JESSE F. WALDRON.